United States Patent
Aoki (10) Patent No.: US 10,010,873 B2
(45) Date of Patent: Jul. 3, 2018

(54) CATALYTIC CONVERTER

(71) Applicant: TOYOTA JIDOSHA KABUSHIKI KAISHA, Toyota-shi, Aichi-ken (JP)

(72) Inventor: Yuki Aoki, Seto (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 6 days.

(21) Appl. No.: 14/766,883

(22) PCT Filed: Dec. 19, 2013

(86) PCT No.: PCT/JP2013/084081
§ 371 (c)(1),
(2) Date: Aug. 10, 2015

(87) PCT Pub. No.: WO2014/125734
PCT Pub. Date: Aug. 21, 2014

(65) Prior Publication Data
US 2015/0375206 A1    Dec. 31, 2015

(30) Foreign Application Priority Data

Feb. 13, 2013 (JP) .................................. 2013-025698

(51) Int. Cl.
*B01J 23/63* (2006.01)
*F01N 3/10* (2006.01)
(Continued)

(52) U.S. Cl.
CPC .......... *B01J 23/63* (2013.01); *B01D 53/9413* (2013.01); *B01D 53/9422* (2013.01); *B01J 23/40* (2013.01);
(Continued)

(58) Field of Classification Search
CPC ... B01J 23/63; B01J 23/40; B01J 35/04; B01J 35/0006; B01J 23/464; B01J 37/0244;
(Continued)

(56) References Cited

U.S. PATENT DOCUMENTS 5,376,610 A * 12/1994 Takahata .............. B01J 37/0244
423/213.7
5,474,745 A * 12/1995 Fukui ................. B01D 53/9431
422/171
(Continued)

FOREIGN PATENT DOCUMENTS

JP         10-216514 A     8/1998
JP       2004-283692 A    10/2004
(Continued)

*Primary Examiner* — Anthony J Zimmer
(74) *Attorney, Agent, or Firm* — Sughrue Mion, PLLC (57) ABSTRACT

Provided is a catalytic converter capable of obtaining superior NOx purification performance while reducing the amount of a noble metal catalyst. A catalytic converter 10 includes: a substrate 1 having a cell structure in which exhaust gas flows; and catalyst layers 3 that are formed on cell wall surfaces 2 of the substrate 1. The catalyst layers 3 include a first catalyst layer 4 disposed on an upstream side of the substrate 1 in an exhaust gas flow direction and a second catalyst layer 5 disposed on a downstream side of the substrate in the exhaust gas flow direction. The first catalyst layer 4 is formed of a support and rhodium which is a noble metal catalyst supported on the support. The second catalyst layer 5 is formed of a support and palladium or platinum which is a noble metal catalyst supported on the support. The first catalyst layer 4 is formed in a range of 80% to 100% of a total length of the substrate 1 starting from an end of the substrate on the upstream side, and the second catalyst layer 15 5 is formed in a range of 20% to 50% of the total length of the substrate 1 starting from an end of the substrate on the downstream side.

13 Claims, 5 Drawing Sheets

(51) Int. Cl.
*B01J 23/40* (2006.01)
*B01J 23/46* (2006.01)
*F01N 3/08* (2006.01)
*F01N 3/28* (2006.01)
*B01D 53/94* (2006.01)
*B01J 37/02* (2006.01)
*B01J 35/00* (2006.01)
*B01J 35/04* (2006.01)

(52) U.S. Cl.
CPC ......... *B01J 23/464* (2013.01); *B01J 35/0006* (2013.01); *B01J 35/04* (2013.01); *B01J 37/0244* (2013.01); *F01N 3/0864* (2013.01); *F01N 3/10* (2013.01); *F01N 3/2828* (2013.01); *B01D 2255/1021* (2013.01); *B01D 2255/1023* (2013.01); *B01D 2255/1025* (2013.01); *B01D 2255/2042* (2013.01); *B01D 2255/2061* (2013.01); *B01D 2255/2063* (2013.01); *B01D 2255/2065* (2013.01); *B01D 2255/2092* (2013.01); *B01D 2255/20715* (2013.01); *B01D 2255/9022* (2013.01); *B01D 2255/9035* (2013.01); *B01D 2258/01* (2013.01); *B01J 2523/00* (2013.01); *F01N 2510/0682* (2013.01); *Y02T 10/20* (2013.01)

(58) Field of Classification Search
CPC ............ B01J 2523/00; B01D 53/9413; B01D 53/9422; B01D 2255/2063; B01D 2255/2042; B01D 2255/2065; B01D 2255/2092; B01D 2255/20715; B01D 2255/2061; B01D 2255/1021; B01D 2255/9022; B01D 2258/01; B01D 2255/1023; B01D 2255/9035; B01D 2255/1025; F01N 3/0864; F01N 3/2828; F01N 3/10; F01N 2510/0682; Y02T 10/20

See application file for complete search history.

(56) References Cited

U.S. PATENT DOCUMENTS

| | | | | |
|---|---|---|---|---|
| 2001/0053340 A1* | 12/2001 | Noda | .................... | B01D 53/945 423/213.2 |
| 2004/0001781 A1* | 1/2004 | Kumar | .................... | B01J 23/44 422/180 |
| 2005/0031501 A1 | 2/2005 | Kawai et al. | | |
| 2005/0255993 A1* | 11/2005 | Tanaka | .................... | B01D 53/945 502/302 |
| 2006/0128562 A1* | 6/2006 | Miyoshi | .................... | B01D 53/945 502/303 |
| 2008/0042104 A1* | 2/2008 | Chen | .................... | B01D 53/945 252/372 |
| 2008/0044329 A1* | 2/2008 | Chen | .................... | B01D 53/945 423/213.2 |
| 2008/0044330 A1* | 2/2008 | Chen | .................... | B01D 53/945 423/213.5 |
| 2008/0081761 A1* | 4/2008 | Suzuki | .................... | B01D 53/945 502/304 |
| 2008/0081762 A1 | 4/2008 | Kitamura et al. | | |
| 2009/0124494 A1* | 5/2009 | Suzuki | .................... | B01D 53/945 502/325 |
| 2009/0203515 A1* | 8/2009 | Murabayashi | .................... | B01D 53/885 502/4 |
| 2009/0257933 A1* | 10/2009 | Chen | .................... | B01D 53/945 423/213.2 |
| 2011/0126528 A1* | 6/2011 | Yamada | .................... | B01D 53/9468 60/299 |
| 2011/0158871 A1* | 6/2011 | Arnold | .................... | B01J 35/0006 423/212 |
| 2012/0031085 A1* | 2/2012 | Zhang | .................... | B01D 53/9468 60/299 |
| 2012/0128557 A1* | 5/2012 | Nunan | .................... | B01D 53/945 423/213.5 |
| 2012/0283091 A1* | 11/2012 | Sunada | .................... | B01D 53/945 502/304 |
| 2013/0203588 A1* | 8/2013 | Nobukawa | .................... | F01N 3/0807 502/339 |
| 2013/0213000 A1* | 8/2013 | Segawa | .................... | B01D 53/9422 60/39.5 |
| 2013/0310248 A1 | 11/2013 | Aoki et al. | | |

FOREIGN PATENT DOCUMENTS

| | | | | |
|---|---|---|---|---|
| JP | 2009-254987 A | 11/2009 | | |
| JP | 2012-020276 A | 2/2012 | | |
| JP | 2012-040547 A | 3/2012 | | |
| JP | 2012-152702 A | 8/2012 | | |
| WO | 2006/057067 A1 | 6/2006 | | |
| WO | WO 2012101505 A1 * | 8/2012 | ........... | B01D 53/945 |

* cited by examiner

CATALYTIC CONVERTER

TECHNICAL FIELD

The present invention relates to a catalytic converter that is accommodated and fixed in a pipe constituting an exhaust system for exhaust gas.

BACKGROUND ART

In various industries, various efforts to reduce environmental impacts have been made on a global scale. In particular, in the automobile industry, the development of techniques has progressed for the spread of not only a gasoline engine vehicle having superior fuel efficiency but also a so-called eco-car such as a hybrid vehicle or an electric vehicle and for further improvement in the performance of the vehicles. Along with the development of such an eco-car, studies regarding an exhaust gas purification catalyst which purifies exhaust gas exhausted from an engine have been actively made. This exhaust gas purification catalyst includes an oxidation catalyst, a three way catalyst, and a NOx storage reduction catalyst. In the exhaust gas purification catalyst, catalytic activity is exhibited by a noble metal catalyst such as platinum (Pt), palladium (Pd), or rhodium (Rh). In general, this noble metal catalyst is used in a state of being supported on a support formed of a porous oxide such as alumina.

In an exhaust system for exhaust gas that connects a vehicle engine and a muffler to each other, a catalytic converter for purifying exhaust gas is generally provided. The engine may emit environmentally harmful materials such as CO, NOx, or unburned HC or VOC. In order to convert such harmful materials into environmentally acceptable materials, exhaust gas is caused to flow through a catalytic converter such that CO is converted into $CO_2$, NOx is converted into $N_2$ and $O_2$, and VOC is burned to produce $CO_2$ and $H_2O$. In the catalytic converter, catalyst layers having a noble metal catalyst such as Rh, Pd, or Pt supported on a support are formed on cell wall surfaces of a substrate. Examples of the support for supporting the noble metal catalyst include a $CeO_2$—$ZrO_2$ solid solution (also referred to as CZ material, cerium oxide (ceria)-zirconia composite oxide, and the like). This support is also called a co-catalyst and is an essential component of the three way catalyst which simultaneously removes harmful components in exhaust gas such as CO, NOx, and HC. Examples of an essential component of the co-catalyst include $CeO_2$. The oxidation number of $CeO_2$ changes into, for example, $Ce^{3+}$ or $Ce^{4+}$ depending on the oxygen partial pressure in exhaust gas to which $CeO_2$ is exposed. In order to compensate for deficiency of charges, $CeO_2$ has a function of adsorbing and desorbing oxygen and a function of storing oxygen (OSC: Oxygen Storage Capacity). In order to maintain a purification window of the three way catalyst, a variation in the atmosphere of exhaust gas is absorbed and alleviated such that the purification window can be maintained at substantially a theoretical air fuel ratio.

Incidentally, from the viewpoints of reducing material risk of rare metal and the like and obtaining cost competitiveness, how to decrease the amount of the noble metal catalyst used in the three way catalyst is an important factor. However, when the amount of the noble metal catalyst in the three way catalyst is significantly decreased, the catalytic activity is also significantly decreased. Consequently, the above-described OSC, low-temperature activity, NOx purification performance in a high-temperature environment, and the like are significantly decreased. The reason is as follows. Along with a significant decrease in the amount of the noble metal catalyst, the number of active sites is also significantly decreased, and the number of catalytic reaction sites is significantly decreased. As a result, a decrease in purification performance is significant.

Among the noble metal catalysts including Pt, Pd, and Rh which are particularly used in the three way catalyst, Rh has the highest NOx purification performance but has the highest market price per unit weight. In addition, it is known that Rh exhibits high OSC by being supported on a co-catalyst containing cerium oxide (ceria). However, it is also known that a trade-off relationship is established in that, as the amount of cerium oxide in the co-catalyst for supporting Rh increases, conversely, the NOx purification performance as a characteristic of Rh decreases. Therefore, when Rh is used as the noble metal catalyst in the three way catalyst, the design criteria during the preparation of the three way catalyst need to be set such that both the OSC and the NOx purification performance are simultaneously at an optimum.

In regard to the preparation of the optimum three way catalyst, in consideration of the fact that the performances of various catalytic noble metals and supports vary depending on the respective components thereof, a zone-coated catalyst, in which different components are disposed on an upstream side and a downstream side of a substrate so as to efficiently exhibit characteristics of the respective components, has been actively studied.

In regard to this zone-coated catalyst, PTL 1 discloses an exhaust gas purification catalyst including: a substrate for forming a gas passage through which exhaust gas flows; and catalyst layers that are formed on the substrate. More specifically, the catalyst layers applied herein include: a lower catalyst layer that is formed on a surface of the substrate; a front-upper catalyst layer with which a surface of the lower catalyst layer on an upstream side in a gas flow direction is coated; and a rear-upper catalyst layer with which a surface of the lower catalyst layer on a downstream side of the front-upper catalyst layer in the gas flow direction is coated. In addition, at least one of Pd and Pt is supported in the lower catalyst layer, Rh is supported in the rear-upper catalyst layer, Pd is supported in the front-upper catalyst layer, and a support for supporting Pd in the front-upper catalyst layer is a $ZrO_2$ composite oxide containing $Y_2O_3$. According to this configuration, the purification characteristics of the catalytic noble metal can be sufficiently exhibited, and the low-temperature purification performance of the catalyst can be improved. In addition, by using the $ZrO_2$ composite material to which $Y_2O_3$ is added, which has a low specific heat and superior heat resistance, as the support material of the front-upper catalyst layer, heat resistance can be secured while improving catalyst temperature rise performance, and catalyst warm-up performance including durability can be obtained.

On the other hand, PTL 2 discloses an exhaust gas purification catalyst including: a substrate; a lower catalyst layer that is formed on the substrate and contains at least one of Pd and Pt; and an upper catalyst layer that is formed on the lower catalyst layer and contains Rh, in which a region not including the upper catalyst layer is disposed on an exhaust gas upstream side of the exhaust gas purification catalyst, the lower catalyst layer includes a front-lower catalyst layer disposed on the exhaust gas upstream side and a rear-lower catalyst layer disposed on an exhaust gas downstream side, and the front-lower catalyst layer contains an oxygen storage material. According to this configuration, the grain growth of the respective catalytic metals supported in the respective catalyst layers, in particular, in the rear-lower catalyst layer and the upper catalyst layer on the exhaust gas downstream side can be significantly suppressed. Further, by providing the region not including upper catalyst layer on the exhaust gas upstream side, the diffusibility of HC to the inside of the front-lower catalyst layer can be improved, and the purification of HC in the front-lower catalyst layer is accelerated such that sufficient catalyst warm-up performance can be achieved.

Further, PTL 3 discloses an exhaust gas purification catalyst in which catalyst layers includes: a lower catalyst layer that is formed on a surface of a substrate; a front-upper catalyst layer with which a surface of the lower catalyst layer on an upstream side in a gas flow direction is coated; and a rear-upper catalyst layer with which a surface of the lower catalyst layer on a downstream side of the front-upper catalyst layer in the gas flow direction is coated. In the exhaust gas purification catalyst, at least one of Pd and Pt is supported in the lower catalyst layer, Pd is supported in the front-upper catalyst layer, Rh is supported in the rear-upper catalyst layer, and a concentration of Pd supported in the front-upper catalyst layer is 4.5 mass % to 12 mass %. According to this configuration, the purification characteristics of the catalytic noble metal can be sufficiently exhibited, and the low-temperature purification performance of the catalyst can be improved.

In this way, various techniques regarding the zone-coated catalyst are present. Under the above circumstances, the present inventors revised the configuration of the zone-coated catalyst and conceived a catalytic converter capable of obtaining superior NOx purification performance while reducing the amount of a noble metal catalyst.

CITATION LIST

Patent Literature

PTL 1: Japanese Patent Application Publication No. 2012-040547
PTL 2: Japanese Patent Application Publication No. 2012-152702
PTL 3: Japanese Patent Application Publication No. 2012-020276

SUMMARY OF THE INVENTION

The present invention has been made in consideration of the above-described problems, and an object thereof is to provide a catalytic converter capable of obtaining superior NOx purification performance while reducing the amount of a noble metal catalyst.

In order to achieve the above-described object, according to an aspect of the invention, there is provided a catalytic converter including: a substrate having a cell structure in which exhaust gas flows; and catalyst layers that are formed on cell wall surfaces of the substrate, in which the catalyst layers include a first catalyst layer disposed on an upstream side of the substrate in an exhaust gas flow direction and a second catalyst layer disposed on a downstream side of the substrate in the exhaust gas flow direction, the first catalyst layer is formed of a support and rhodium which is a noble metal catalyst supported on the support, the second catalyst layer is formed of a support and palladium or platinum which is a noble metal catalyst supported on the support, the first catalyst layer is formed in a range of 80% to 100% of a total length of the substrate starting from an end of the substrate on the upstream side, and the second catalyst layer is formed in a range of 20% to 50% of the total length of the substrate starting from an end of the substrate on the downstream side.

In the catalytic converter according to the present invention, the zone-coated catalyst is used as the catalyst layers that are formed on the cell walls of the substrate having a cell structure; the first catalyst layer is disposed on the upstream side (Fr side) of the substrate in the exhaust gas flow direction; the second catalyst layer is disposed on the downstream side (Rr side) of the substrate in the exhaust gas flow direction; rhodium is used as the noble metal catalyst of the first catalyst layer; palladium or platinum is used as the noble metal catalyst of the second catalyst layer; the length of the first catalyst layer is in a range of 80% to 100% with respect to the length of the substrate; and the length of the second catalyst layer is in a range of 20% to 50% with respect to the length of the substrate. As a result, in the catalytic converter, superior NOx purification performance can be obtained while reducing as much as possible the amount of a noble metal catalyst used, in particular, rhodium.

Here, as the substrate having a cell structure, not only a ceramic material such as cordierite or silicon carbide which is formed of a composite oxide of magnesium oxide, aluminum oxide, and silicon dioxide; but also a material other than a ceramic material such as a metal material may be used. In addition, in this configuration, a so-called honeycomb structure including cells having plural lattice contours which have, for example, rectangular, hexagonal, and octagonal shapes can be adopted.

In addition, examples of the supports constituting the first and second catalyst layers that are formed on the cell wall surfaces of the substrate include oxides containing at least one porous oxide of $CeO_2$, $ZrO_2$, and $Al_2O_3$ as a major component; one oxide among ceria ($CeO_2$), zirconia ($ZrO_2$), and alumina ($Al_2O_3$); and a composite oxide formed of two or more oxides among ceria ($CeO_2$), zirconia ($ZrO_2$), and alumina ($Al_2O_3$) (for example, a $CeO_2$—$ZrO_2$ compound which is a CZ material, or an $Al_2O_3$—$CeO_2$—$ZrO_2$ ternary composite oxide (ACZ material) into which $Al_2O_3$ is introduced as a diffusion barrier).

According to the verification of the present inventors, it was verified that the NOx purification performance is extremely superior under the following conditions: the length of the first catalyst layer in which rhodium is used as the noble metal catalyst is in a range of 80% to 100% with respect to the length of the substrate; and the length of the second catalyst layer in which palladium or platinum is used as the noble metal catalyst is in a range of 20% to 50% with respect to the length of the substrate.

For example, when the length of the first catalyst layer is 90% with respect to the length of the substrate, and when the length of the second catalyst layer is 50% with respect to the length of the substrate, both the catalyst layers are overlapped in a range of 40% with respect to the length of the substrate. In this case, for example, all the catalyst layers are formed such that the first catalyst layer directly overlaps the second catalyst layer.

Palladium is likely to form an alloy with rhodium. Therefore, rhodium in which sintering is less likely to occur due to its relatively high melting point is applied to the first catalyst layer that is formed on the exhaust gas flow upstream side of the substrate in which exhaust gas having a relatively high temperature flows. On the other hand, palladium in which sintering is likely to occur due to its relatively low melting point is applied to the second catalyst layer that is formed on the exhaust gas flow downstream side of the substrate in which exhaust gas having a relatively low temperature flows. As a result, the NOx purification performance can be improved while suppressing the alloying between the noble metal catalysts.

By using platinum having a wider air-fuel ratio width than that of palladium as the noble metal catalyst of the second catalyst layer, a catalytic converter having higher purification performance can be obtained.

In the catalytic converter according to the preferable embodiment of the invention, the support of the first catalyst layer does not contain cerium.

According to the verification of the present inventors, it was specified that the NOx purification performance can be further improved by not using cerium as the support constituting the first catalyst layer in which rhodium is used as the noble metal catalyst.

The catalytic converter according to the present invention preferably has a cordierite honeycomb support having superior thermal shock resistance but may be an electrically heated catalytic converter (EHC: Electrically Heated Converter). In the electrically heated catalytic converter, for example, a pair of electrodes is attached to a honeycomb catalyst, the honeycomb catalyst is heated by causing a current to flow through the electrodes, and the activity of the honeycomb catalyst is improved so as to detoxify the exhaust gas passing therethrough. By applying this electrically heated catalytic converter to an exhaust system for exhaust gas that connects a vehicle engine and a muffler to each other, exhaust gas can be purified not only at room temperature but also at a cold temperature by activating the catalyst due to electric heating.

As can be seen from the above description, in the catalytic converter according to the present invention, the first catalyst layer is disposed on the upstream side of the substrate in the exhaust gas flow direction; the second catalyst layer is disposed on the downstream side of the substrate in the exhaust gas flow direction; rhodium is used as the noble metal catalyst of the first catalyst layer; palladium or platinum is used as the noble metal catalyst of the second catalyst layer; the length of the first catalyst layer is in a range of 80% to 100% with respect to the length of the substrate; and the length of the second catalyst layer is in a range of 20% to 50% with respect to the length of the substrate. As a result, in the catalytic converter, superior NOx purification performance can be obtained while reducing as much as possible the amount of a noble metal catalyst used, in particular, rhodium.

MODES FOR CARRYING OUT THE INVENTION

Hereinafter, an embodiment of a catalytic converter according to the present invention will be described with reference to the drawings.

(Exhaust System for Exhaust Gas)

First, an exhaust system for exhaust gas in which the catalytic converter according to the present invention is provided will be briefly described. In the exhaust system for exhaust gas to which the catalytic converter according to the present invention is applied, an engine, a catalytic converter, a three-way catalytic converter, a sub muffler, and a main muffler are disposed and connected to each other through a system pipe, and exhaust gas produced from the engine flows to each unit through the system pipe and is exhausted. Next, hereinafter, the embodiment of the catalytic converter will be described.

(Embodiment of Catalytic Converter)

FIG. 1(a) is a schematic diagram showing a catalytic converter according to the present invention, and FIG. 1(b) is an enlarged view showing a part of cells. In addition, FIGS. 2(a), 2(b), 3(a), 3(b), 4(a), and 4(b) are vertical sectional views showing Embodiments 1 to 6 of catalyst layers.

Figure 1:
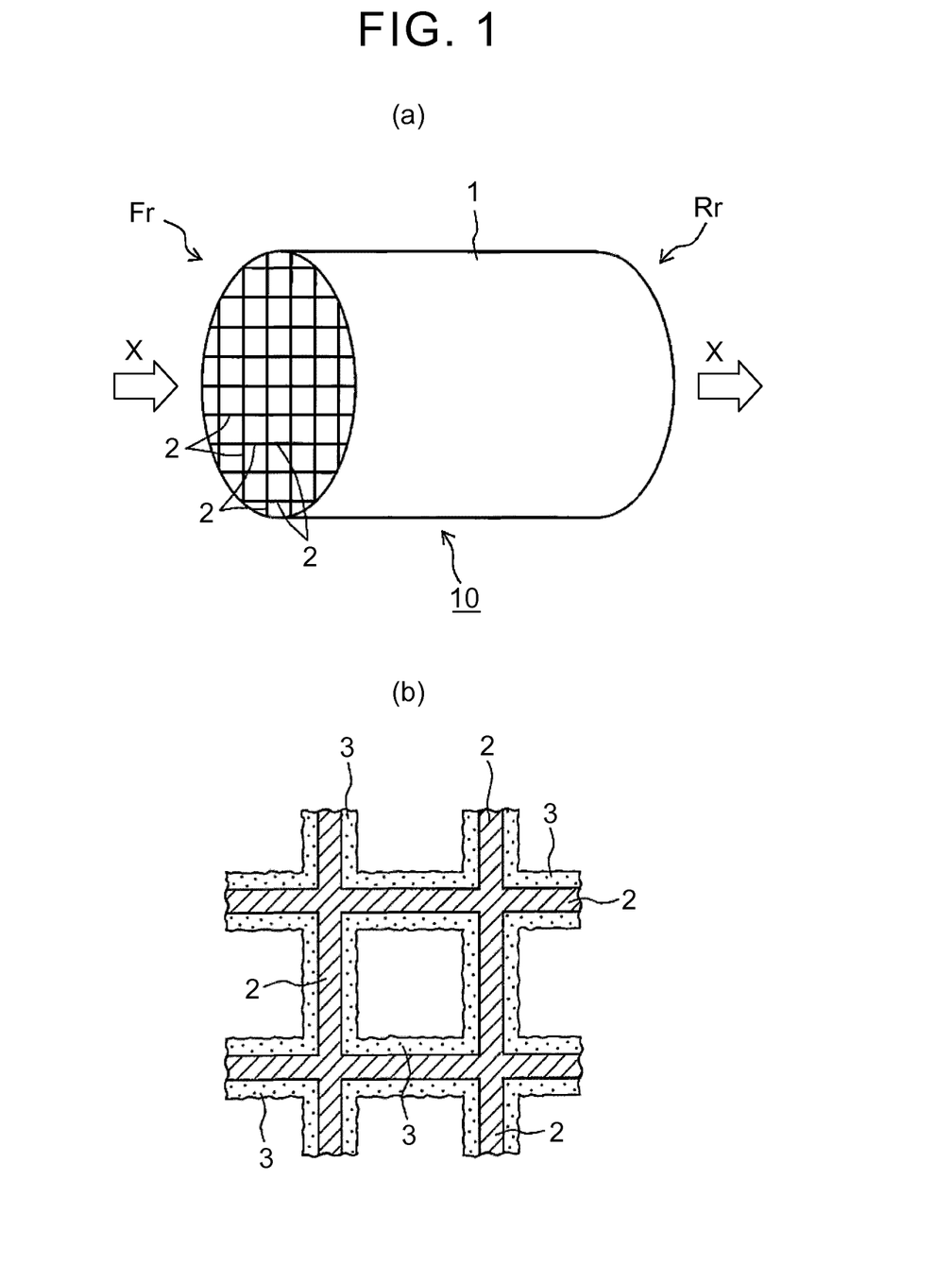
FIG. 1(a) is a schematic diagram showing a catalytic converter according to the present invention.
FIG. 1(b) is an enlarged view showing a part of cells.

Briefly, a catalytic converter 10 shown in FIG. 1 includes: a cylindrical substrate 1 having plural cells; and catalyst layers 3 that are formed on surfaces of cell walls 2 constituting the cells.

Here, examples of a material of the substrate 1 include a ceramic material such as cordierite or silicon carbide which is formed of a composite oxide of magnesium oxide, aluminum oxide, and silicon dioxide; and a material other than a ceramic material such as a metal material. In addition, examples of a support constituting the catalyst layers 3 that are formed on the surfaces of the cell walls 2 of the substrate 1 include oxides containing at least one porous oxide of $CeO_2$, $ZrO_2$, and $Al_2O_3$ as a major component; one oxide among ceria ($CeO_2$), zirconia ($ZrO_2$), and alumina ($Al_2O_3$); and a composite oxide formed of two or more oxides among ceria ($CeO_2$), zirconia ($ZrO_2$), and alumina ($Al_2O_3$) (for example, a $CeO_2$—$ZrO_2$ compound which is a CZ material, or an $Al_2O_3$—$CeO_2$—$ZrO_2$ ternary composite oxide (ACZ material) into which $Al_2O_3$ is introduced as a diffusion barrier).

The substrate 1 has a honeycomb structure including cells having plural lattice contours which have, for example, rectangular, hexagonal, and octagonal shapes. Exhaust gas, which flows to the inside of cells at an end of the substrate 1 on an upstream side (Fr side) in an exhaust gas flow direction, flows to the inside of the substrate 1. During the flow process, the exhaust gas is purified, and the purified exhaust gas flows out from an end of the substrate 1 on a downstream side (Rr side) in the exhaust gas flow direction (X direction).

Next, the catalyst layers formed on the surfaces of the cell walls 2 will be described with reference to FIGS. 2 to 4. In each drawing, upper and lower cell walls forming one cell are shown.

FIG. 2(a) shows zone-coated catalyst layers 3 according to Embodiment 1.

The catalyst layers 3 shown in the same drawing includes a first catalyst layer 4 and a second catalyst layer 5, in which the first catalyst layer 4 has a length of 80% with respect to the length (100%) of the substrate 1 starting from the end of the substrate 1 on the upstream side (Fr side) in the exhaust gas flow direction, the second catalyst layer 5 has a length of 20% with respect to the length (100%) of the substrate 1 starting from the end of the substrate 1 on the downstream side (Rr side) in the exhaust gas flow direction, and both the catalyst layers are not overlapped.

In the first catalyst layer 4, rhodium is used as a noble metal catalyst supported on a support. In the second catalyst layer 5, palladium or platinum is used as a noble metal catalyst supported on a support.

As the support for supporting rhodium in the first catalyst layer 4, a material not containing cerium is preferably used. Examples of the support include an oxide formed of one of zirconia ($ZrO_2$) and alumina ($Al_2O_3$); and an $Al_2O_3$—$ZrO_2$ binary composite oxide (AZ material).

According to the catalyst layers 3 shown in the drawing, rhodium is not used over the entire length thereof. Therefore, the amount of the rhodium used, which is the most expensive among the noble metal catalysts, can be reduced. Further, the first catalyst layer has a length of 80% on the upstream side with respect to the length of the substrate 1. The second catalyst layer 5 in which palladium or the like is used as the noble metal catalyst has a length of 20% on the downstream side with respect to the length of the substrate 1. As a result, the catalyst layer 3 having superior NOx purification performance is formed.

Figure 2:
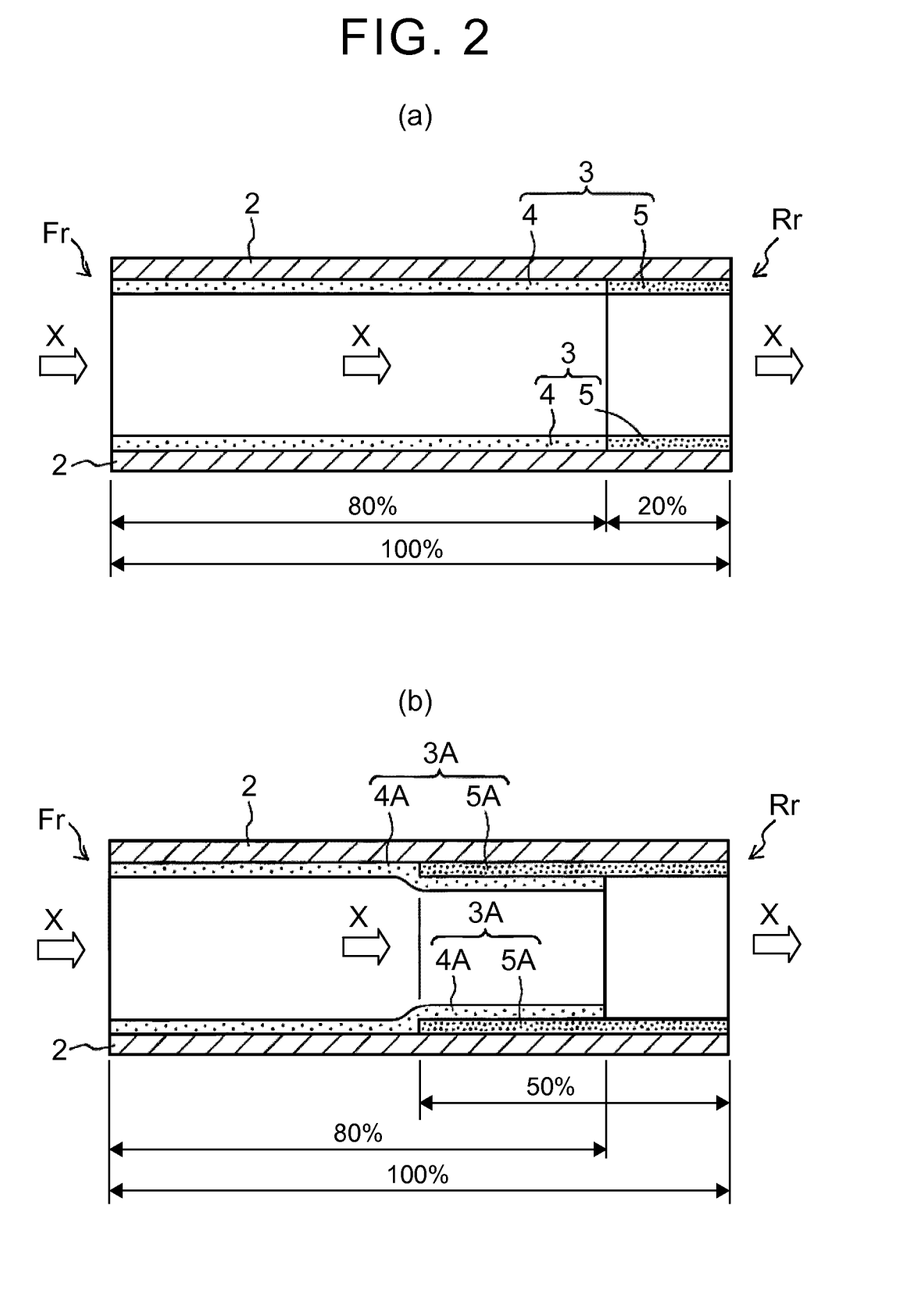
FIG. 2(a) is a vertical sectional view showing Embodiment 1 of catalyst layers.
FIG. 2(b) is a vertical sectional view showing Embodiment 2 of catalyst layers.

On the other hand, FIG. 2(*b*) shows zone-coated catalyst layers 3A according to Embodiment 2. In the configuration of the catalyst layers 3A shown in the same drawing, a second catalyst layer 5A has a length of 50% with respect to the length of the substrate 1, a first catalyst layer 4A has a length of 80% with respect to the length of the substrate 1, and both the catalyst layers are overlapped in a range of 30%. Due to the catalyst layers 3A shown in the drawing, the amount of rhodium used is reduced, and superior NOx purification performance can be expected.

Figure 3:
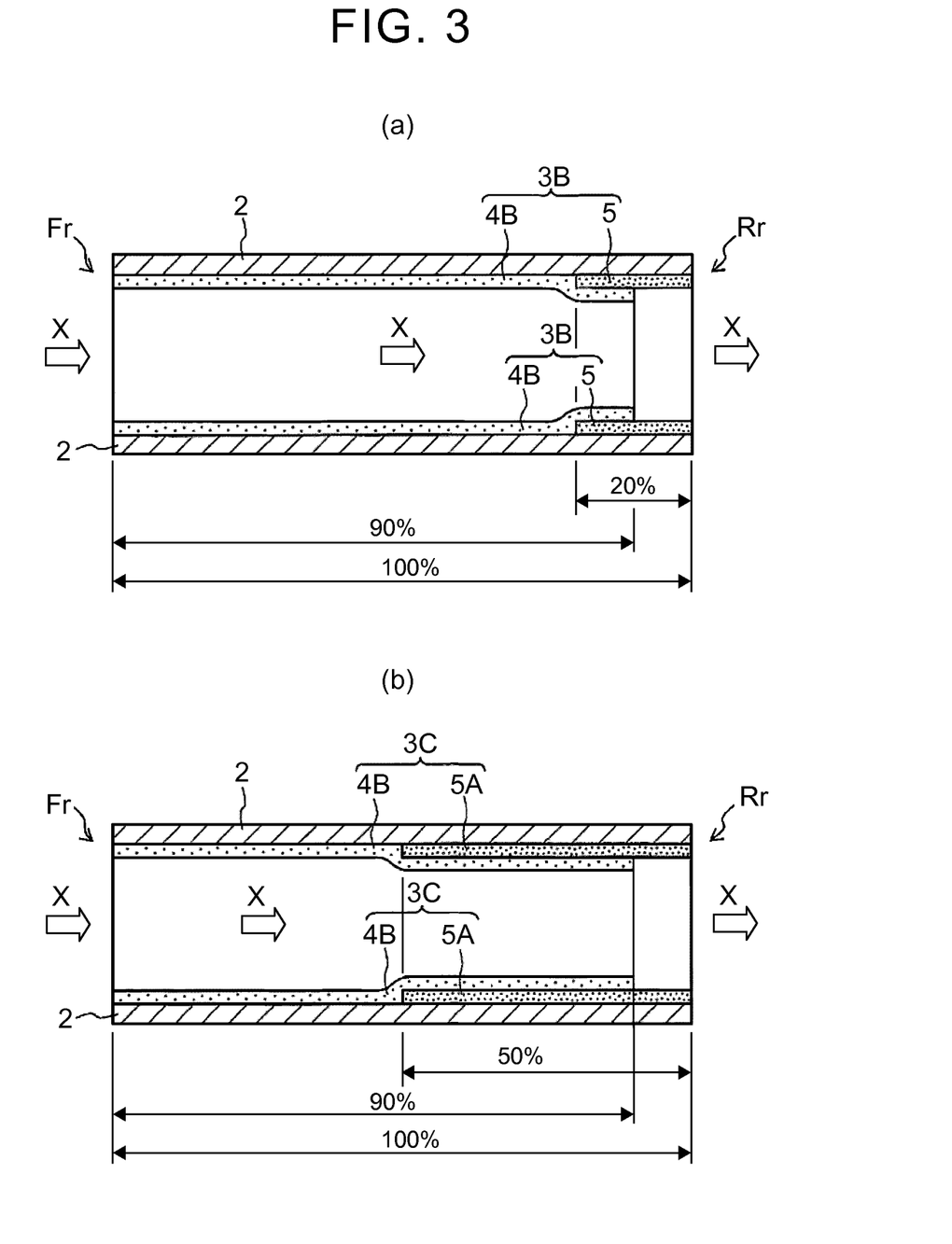
FIG. 3(a) is a vertical sectional view showing Embodiment 3 of catalyst layers.
FIG. 3(b) is a vertical sectional view showing Embodiment 4 of catalyst layers.

On the other hand, FIG. 3(*a*) shows zone-coated catalyst layers 3B according to Embodiment 3. In the configuration of the catalyst layers 3B shown in the same drawing, the second catalyst layer 5 has a length of 20% with respect to the length of the substrate 1, a first catalyst layer 4B has a length of 90% with respect to the length of the substrate 1, and both the catalyst layers are overlapped in a range of 10%. Due to the catalyst layers 3B shown in the drawing, the amount of rhodium used is reduced, and superior NOx purification performance can be expected.

On the other hand, FIG. 3(*b*) shows zone-coated catalyst layers 3C according to Embodiment 4. In the configuration of the catalyst layers 3C shown in the same drawing, the second catalyst layer 5A has a length of 50% with respect to the length of the substrate 1, the first catalyst layer 4B has a length of 90% with respect to the length of the substrate 1, and both the catalyst layers are overlapped in a range of 40%. Due to the catalyst layers 3C shown in the drawing, the amount of rhodium used is reduced, and superior NOx purification performance can be expected.

Figure 4:
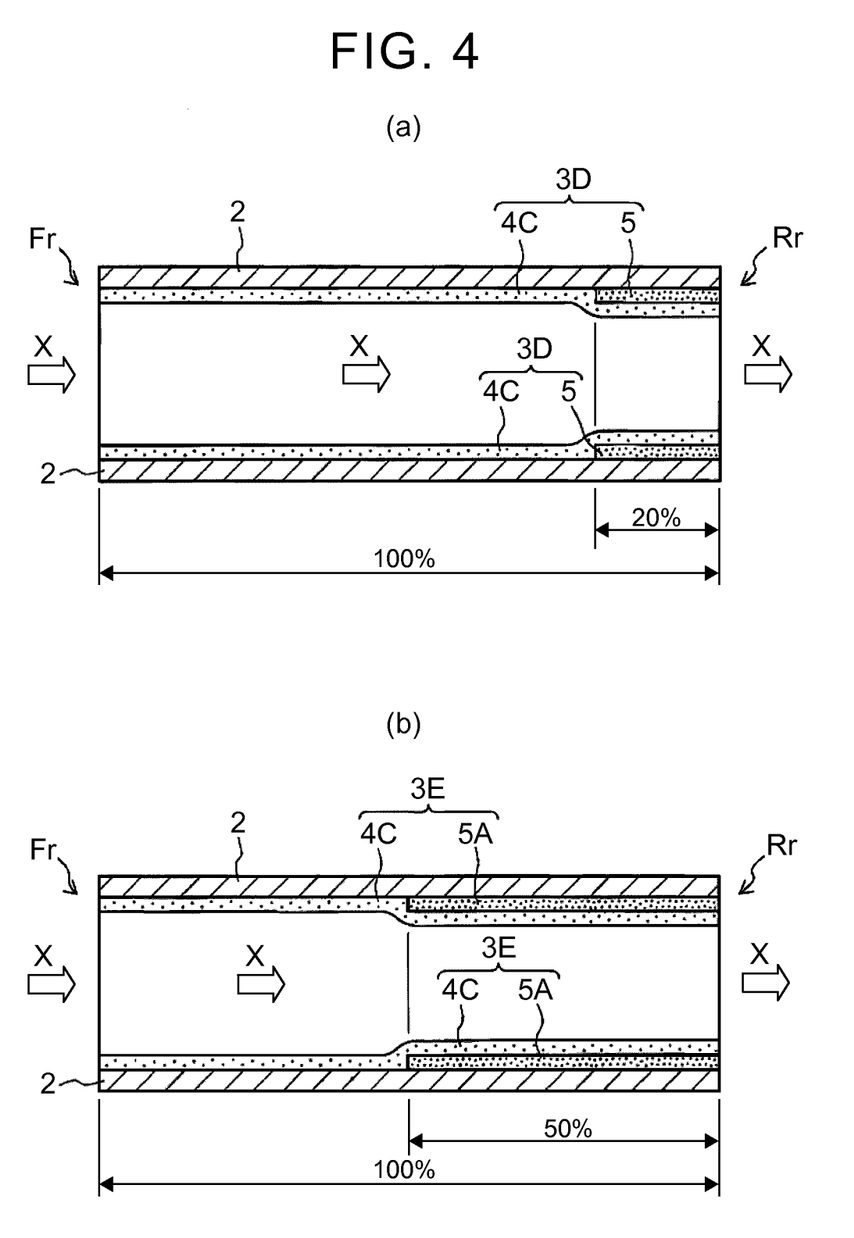
FIG. 4(a) is a vertical sectional view showing Embodiment 5 of catalyst layers.
FIG. 4(b) is a vertical sectional view showing Embodiment 6 of catalyst layers.

On the other hand, FIG. 4(*a*) shows zone-coated catalyst layers 3D according to Embodiment 5. In the configuration of the catalyst layers 3D shown in the same drawing, the second catalyst layer 5 has a length of 20% with respect to the length of the substrate 1, a first catalyst layer 4C has a length of 100% with respect to the length of the substrate 1, and both the catalyst layers are overlapped in a range of 20%. Due to the catalyst layers 3D shown in the drawing, superior NOx purification performance can be expected.

Further, FIG. 4(*b*) shows zone-coated catalyst layers 3E according to Embodiment 6. In the configuration of the catalyst layers 3E shown in the same drawing, the second catalyst layer 5A has a length of 50% with respect to the length of the substrate 1, the first catalyst layer 4C has a length of 100% with respect to the length of the substrate 1, and both the catalyst layers are overlapped in a range of 50%. Due to the catalyst layers 3E shown in the drawing, superior NOx purification performance can be expected.

In addition to the examples shown in the drawings, there are various combination embodiments which satisfy the following configurations: the first catalyst layer is formed in a range of 80% to 100% of the total length of the substrate 1 starting from the end of the substrate 1 on the upstream side; and the second catalyst layer is formed in a range of 20% to 50% of the total length of the substrate starting from the end of the substrate 1 on the downstream side.

[Experiment (Part 1) for Determining Optimum Range of Second Catalyst Layer, and Results Thereof]

The present inventors defined the length of the first catalyst layer to be 80% with respect to the length of the substrate, and changed the length of the second catalyst layer to be 0%, 10%, 30%, 50%, 80%, and 100% with respect to the length of the substrate. A catalytic converter including catalyst layers of each case was prepared, a durability test was performed, and an experiment of measuring the amount of NOx in a normal rich state was performed.

(Regarding Method of Preparing Catalyst Slurry)

Regarding the preparation of a slurry for forming the second catalyst layer (Pd was used as the noble metal catalyst), 65 g/L of an $Al_2O_3$ composite oxide as a support was impregnated with a palladium nitrate solution. As a result, 1.0 mass % of support powder was prepared. Next, 85 g/L of a $CeO_2$—$ZrO_2$ composite oxide ($CeO_2/ZrO_2/La_2O_3/Y_2O_3$=30/60/5/5 (mass %)), 10 g/L of barium acetate, water, an $Al_2O_3$ binder, acetic acid, a thickener, and the like were mixed with each other in predetermined amounts. As a result, a Pd catalyst slurry was obtained.

On the other hand, regarding the preparation of a slurry for forming the first catalyst layer (Rh was used as the noble metal catalyst), 65 g/L of a $CeO_2$—$ZrO_2$ composite oxide ($Al_2O_3/CeO_2/ZrO_2/La_2O_3/Y_2O_3/Nd_2O_3$–30/20/44/2/2/2 (mass %)) was prepared, and 0.3 mass % of Rh was supported on each support. Further, 25 g/L of La-added $Al_2O_3$, 10 g/L of barium acetate, water, an $Al_2O_3$ binder, acetic acid, a thickener, and the like were mixed with each other in predetermined amounts. As a result, a Rh catalyst slurry was obtained.

875 cc of a monolith substrate was prepared and was coated with the above-described slurries using a suction method.

The second catalyst layers (Pd-supported catalyst layers), which had lengths of 0%, 10%, 30%, 50%, 80%, and 100% with respect to the length of the substrate starting from the end of the substrate on the Rr side, were formed by coating using the same amount of slurry.

On the other hand, the first catalyst layer (Rh-supported catalyst layer), which had a length of 80% with respect to the length of the substrate starting from the end of the substrate on the Fr side, was formed by coating using the slurry.

(Regarding Durability Test)

The prepared catalytic converter was set immediately below an actual engine, and a durability test was performed thereon at a bed temperature of 1000° C. for 50 hours under a composite pattern where an A/F ratio cyclically changed.

(Regarding Engine Bench Evaluation)

Figure 5:
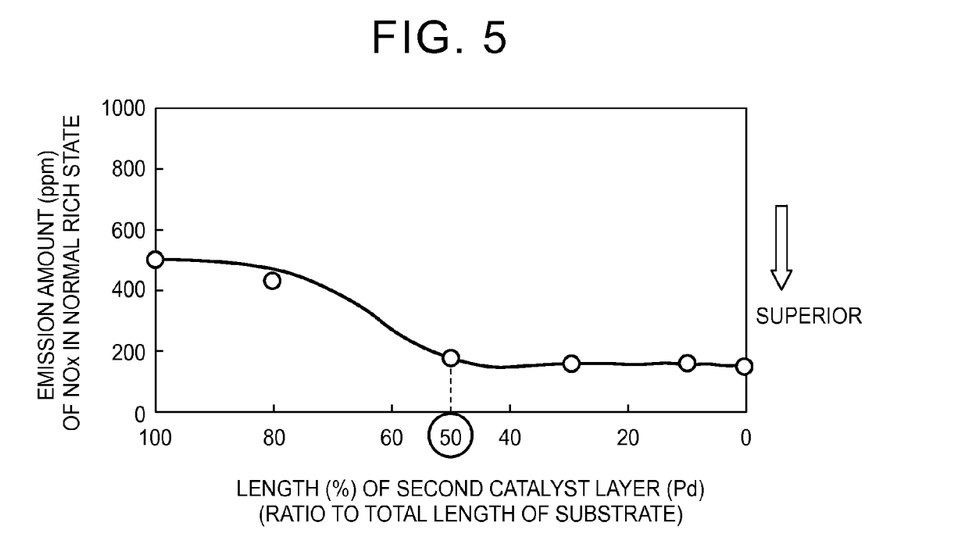
FIG. 5 is a graph showing the experiment results of measuring the emission amount of NOx when the length of the first catalyst layer is fixed to 80% with respect to the length of the substrate, and when the length of the second catalyst layer is changed.

After the durability test, the catalytic converter was set in another actual engine, and the purification performance was calculated as the average emission amount of NOx when an A/F ratio was changed in a rectangular shape from a rich state to a lean state and was maintained in the rich state for 120 seconds. The test results are shown in FIG. 5.

In the same drawing, the emission amount of NOx had an inflection point when the length of the second catalyst layer was 50% with respect to the length of the substrate. When the length of the second catalyst layer was longer than 50%, the emission amount of NOx was increased to be in an unfavorable range as the purification performance and approached 500 ppm. On the other hand, when the length of the second catalyst layer was 50% or shorter, the emission amount of NOx was significantly decreased and saturated at 200 ppm or less.

Based on the experiment results, the upper limit of a ratio of the length of the second catalyst layer to the length of the substrate can be defined as 50%.

Next, hereinafter, in another experiment, the lower limit of the ratio of the length of the second catalyst layer will be defined.

[Experiment (Part 2) for Determining Optimum Range of Second Catalyst Layer, and Results Thereof]

The present inventors prepared a catalytic converter including the catalyst layers according to each of Examples and Comparative Examples, a durability test was performed, and an experiment of measuring the amount of NOx in a normal rich state was performed.

(Regarding Method of Preparing Catalyst Slurry)

Regarding the preparation of a slurry for forming the second catalyst layer (Pd was used as the noble metal catalyst), 65 g/L of an $Al_2O_3$ composite oxide as a support was impregnated with a palladium nitrate solution. As a result, 1.0 mass % of support powder was prepared. Next, 85 g/L of a $CeO_2$—$ZrO_2$ composite oxide ($CeO_2/ZrO_2/La_2O_3/Y_2O_3$=30/60/5/5 (mass %)), 10 g/L of barium acetate, water, an $Al_2O_3$ binder, acetic acid, a thickener, and the like were mixed with each other in predetermined amounts. As a result, a Pd catalyst slurry was obtained.

On the other hand, regarding the preparation of a slurry for forming the first catalyst layer (Rh was used as the noble metal catalyst), 65 g/L of a $CeO_2$—$ZrO_2$ composite oxide ($Al_2O_3/CeO_2/ZrO_2/La_2O_3/Y_2O_3/Nd_2O_3$=30/20/44/2/2/2 (mass %)) was prepared. Here, regarding Example 2, the same amount of a $ZrO_2$ composite oxide ($Al_2O_3/ZrO_2/La_2O_3/Nd_2O_3$=50/46/2/2 (mass %)) was used. 0.3 mass % of Rh was supported on each support. Further, 25 g/L of La-added $Al_2O_3$, 10 g/L of barium acetate, water, an $Al_2O_3$ binder, acetic acid, a thickener, and the like were mixed with each other in predetermined amounts. As a result, a Rh catalyst slurry was obtained.

875 cc of a monolith substrate was prepared and was coated with the above-described slurries using a suction method.

In Comparative Example 1, catalyst layers having a two-layer structure, in which a Pd-supported catalyst layer and a Rh-supported catalyst layer were laminated using the above-described slurries, were formed over the entire length of the substrate.

In Comparative Example 2, catalyst layers having a three-layer structure, in which a Pd-supported catalyst layer and a Rh-supported catalyst layer were laminated using the above-described slurries, were formed over the entire length of the substrate.

On the other hand, in Example 1, as shown in FIG. 2(a), the first catalyst layer having a length of 80% was formed on the upstream side, and the second catalyst layer having a length of 20% was formed on the downstream side (both the layers were not overlapped).

Further, the configuration of the catalyst layers of Example 2 was the same as that of Example 1; however, in the slurry for forming the first catalyst layer, a $ZrO_2$ composite oxide not containing cerium was used.

(Regarding Durability Test)

The prepared catalytic converter was set immediately below an actual engine, and a durability test was performed thereon at a bed temperature of 1000° C. for 50 hours under a composite pattern where an A/F ratio cyclically changed.

(Regarding Engine Bench Evaluation)

Figure 6:
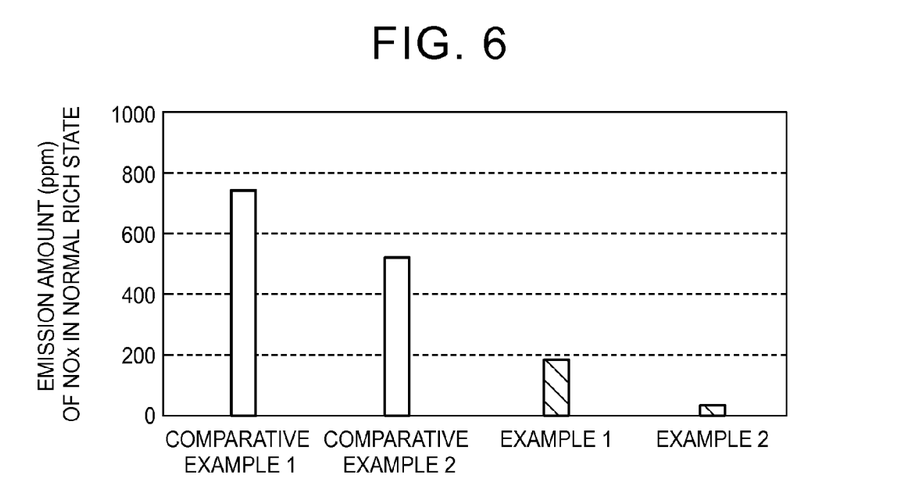
FIG. 6 is a graph showing the experiment results of measuring the emission amount of NOx regarding Comparative Examples and Examples.

After the durability test, the catalytic converter was set in another actual engine, and the purification performance was calculated as the average emission amount of NOx when an A/F ratio was changed in a rectangular shape from a rich state to a lean state and was maintained in the rich state for 120 seconds. The test results are shown in FIG. 6.

It was verified from the same drawing that the emission amount of NOx of Example 1 can be reduced by about 60% to 70% as compared to that of Comparative Examples 1 and 2.

Further, when Example 1 was compared to Example 2, it was verified that the emission amount of NOx of Example 2 can be reduced to about 20% of that of Example 1.

It was verified from the experiment results that the ratio of the length of the second catalyst layer to the length of the substrate is preferably secured to be 20% or higher. This value of 20% can be defined as the lower limit of the ratio of the length of the second catalyst layer. In consideration of the above results and the results of Experiment part 1, the ratio of the length of the second catalyst layer to the length of the substrate can be defined to be in a range of 20% to 50%.

In the above-described experiments, the ratio of the length of the first catalyst layer to the length of the substrate was fixed to 80%. It is needless to say that, as the length of the first catalyst layer containing rhodium increases, a catalytic converter having superior NOx purification performance can be obtained. Accordingly, the above-described value of 80% can be defined as the lower limit of the ratio of the length of the first catalyst layer, and the value of 100% where the length of the first catalyst layer is the same as the length of the substrate can be defined as the upper limit of the ratio of the length of the first catalyst layer. From the viewpoint of reducing the amount of rhodium used, it is preferable that the length of the first catalyst layer is set to be about 80%. Therefore, the length of the first catalyst layer may be appropriately adjusted in a length ratio range of 80% to 100%.

In addition, it was verified that, when the support constituting the first catalyst layer does not contain cerium, the NOx purification performance can be further improved.

Hereinabove, the embodiments of the present invention have been described with reference to the drawings. However, a specific configuration is not limited to the embodiments, and design changes and the like which are made within a range not departing from the scope of the present invention are included in the invention.

REFERENCE SIGNS LIST

1 . . . SUBSTRATE, 2 . . . CELL WALL, 3, 3A, 3B, 3C, 3D, 3E . . . CATALYST LAYER, 4, 4A, 4B, 4C . . . FIRST

CATALYST LAYER, 5, 5A ... SECOND CATALYST LAYER, 10 ... CATALYTIC CONVERTER, Fr ... UPSTREAM SIDE IN EXHAUST GAS FLOW DIRECTION, Rr ... DOWNSTREAM SIDE IN EXHAUST GAS FLOW DIRECTION

The invention claimed is:

1. A catalytic converter comprising:
   a substrate having a cell structure in which exhaust gas flows; and
   catalyst layers that are formed on cell wall surfaces of the substrate, wherein
   the catalyst layers include a first catalyst layer disposed on an upstream side of the substrate in an exhaust gas flow direction and a second catalyst layer disposed on a downstream side of the substrate in the exhaust gas flow direction,
   the first catalyst layer is formed of a support and rhodium which is a noble metal catalyst supported on the support,
   the second catalyst layer is formed of a support and a noble metal catalyst selected from a group consisting of palladium and platinum, the noble metal catalyst being supported on the support,
   the first catalyst layer is formed in a first range of 80% to 100% of a total length of the substrate, the first range starting from an end of the substrate on the upstream side, and
   the second catalyst layer is formed in a second range of 20% to 50% of the total length of the substrate, the second range starting from an end of the substrate on the downstream side, wherein
   the support of the first catalyst layer contains no cerium,
   the first catalyst layer is formed on the second catalyst layer in a portion where the first catalyst layer and the second catalyst layer are overlapped with each other,
   the support of the first catalyst layer comprises a first composite oxide,
   the support of the second catalyst layer comprises a second composite oxide,
   the first composite oxide is different from the second composite oxide, and
   the first catalyst layer and the second catalyst layer are arranged so as to form a layer structure as follows:
   (i) a single layer structure of the first catalyst layer, (ii) a two-layer structure in which the first catalyst layer is stacked on top of the second catalyst layer, and (iii) a single layer structure of the second catalyst layer are arranged in this order from the upstream side of the substrate in the exhaust gas flow direction to the downstream side of the substrate in the exhaust gas flow direction.

2. The catalytic converter according to claim 1, wherein the first catalyst layer directly contacts the substrate on the upstream side of the substrate, and the second catalyst layer directly contacts the substrate on the downstream side of the substrate.

3. The catalytic converter according to claim 1, wherein the second catalyst layer directly contacts the substrate along the total length of the second catalyst layer.

4. The catalytic converter according to claim 1, wherein the first catalyst layer directly contacts the substrate along 50% to 80% of the total length of the substrate.

5. The catalytic converter according to claim 2, wherein the first catalyst layer directly contacts the substrate along 50% to 80% of the total length of the substrate.

6. The catalytic converter according to claim 3, wherein the first catalyst layer directly contacts the substrate along 50% to 80% of the total length of the substrate.

7. The catalytic converter according to claim 1, wherein the second catalyst layer is formed in a second range of from 20% to less than 50% of the total length of the substrate.

8. The catalytic converter according to claim 1, wherein the second catalyst layer is formed in a second range of 20% to 30% of the total length of the substrate.

9. The catalytic converter according to claim 1, wherein the second catalyst layer is formed in a second range of 30% to 50% of the total length of the substrate.

10. An exhaust system comprising:
    an engine;
    the catalytic converter according to claim 1; and
    a muffler,
    wherein the engine, the catalytic converter and the muffler are configured for fluid communication such that exhaust gas from the engine can flow from the engine on one end of the exhaust system to the muffler on another end of the exhaust system;
    the catalytic converter is disposed on a downstream side of the engine in the exhaust gas flow direction, and
    the muffler is disposed on a downstream side of the catalytic converter in the exhaust gas flow direction.

11. The exhaust system according to claim 10, wherein the first catalyst layer directly contacts the substrate on the upstream side of the substrate, and the second catalyst layer directly contacts the substrate on the downstream side of the substrate.

12. The exhaust system according to claim 10, wherein the second catalyst layer directly contacts the substrate along the total length of the second catalyst layer.

13. The exhaust system according to claim 10, wherein the first catalyst layer directly contacts the substrate along 50% to 80% of the total length of the substrate.

* * * * *